May 29, 1962 J. C. C. GANDIER 3,036,553
COLLECTOR TUBE FOR URINE AND ADAPTER THEREFOR
Filed Jan. 26, 1960 2 Sheets-Sheet 1

*INVENTOR.*
John C.C. Gandier
BY Marston L. Hamlin
ATTORNEY

May 29, 1962   J. C. C. GANDIER   3,036,553
COLLECTOR TUBE FOR URINE AND ADAPTER THEREFOR
Filed Jan. 26, 1960   2 Sheets-Sheet 2

INVENTOR.
John C.C. Gandier
BY Marston L. Hamlin
ATTORNEY

United States Patent Office 3,036,553
Patented May 29, 1962

3,036,553
COLLECTOR TUBE FOR URINE AND
ADAPTER THEREFOR
John C. C. Gandier, Dorval, Quebec, Canada, assignor to American Home Products Corporation, New York, N.Y., a corporation of Delaware
Filed Jan. 26, 1960, Ser. No. 4,795
5 Claims. (Cl. 119—95)

This invention relates to a urine-collecting unit comprising a collector tube for urine and an adapter therefor. The invention includes the combination of collector tube, adapter, and means for securing the combination in operable position; it also includes the collector-tube and adapter as separate elements. The combination is designed as a means for collecting urine from female quadrupeds and more particularly from pregnant mares. Pregnant mares' urine, commonly designated as P.M.U., has become an important article of commerce as a source of hormones used in human therapy.

The demand for quality and increased current costs of production at the farm level together make the collection of the maximum amounts of mares' pregnancy urine, free of fecal matter, imperative for the survival of this important farm business.

It is well known to those skilled in the art that fecal contamination quickly destroys the potency of estrogenic substances or hormones in pregnant mares' urine. It is also recognized that freshly voided warm pregnant mares' urine rapidly deteriorates in the collector tubes. It is therefore a practiced part of farm collection procedures of pregnant mares' urine to empty tubes as frequently as possible into the bulk collection receptacles stored in a cool place and charged with chemical preservatives for urine. In addition it is equally well known that the hormonal potency of pregnant mares' urine is destroyed by contact wtih unclean collector tubes containing deposits of urinary solids and debris.

The new collection device herein described has a special and novel design which accomplishes the following functions:

(1) Prevents fecal material gaining access to the collection bag.

(2) Permits viewing the level of collected urine through the transparent part of the collection device, giving visual evidence of which tubes are ready for emptying, thus promoting speed and efficient use of labor.

(3) Does not require unhitching of any harness attachment straps for emptying, thus saving work time and obviating the risk of workers being kicked; permits more frequent and rapid emptying of filled tubes.

(4) Prevents accumulation of urine solids in the bottom of the collection device, where they are difficult to clean out and are a cause of deterioration of urine quality, by permitting sediment to collect in the loop and be flushed down and out as required.

(5) Facilitates cleaning by back flushing cleaning fluids and brushing the interior of bag and emptying tube; this is important for maintenance of quality.

(6) Prevents the loss of voided urine around the entrance of the collection bag.

(7) Avoids spillage of collected urine even if a mare lies down, because the bag is not suspended under the mare and between her hind legs and thus is not subject to squeezing, and because the terminal end of the emptying tube is plugged with a vented stopper.

(8) Permits reading the volume of each animal's production by means of graduations on the transparent emptying tube.

(9) Provides a convenient, easily accessible point of entry of tablets of preservatives for the collected urine through the unplugged end of the emptying tube.

Other advantages will be apparent to those skilled in the art from the following disclosure.

My invention comprises an elongated tubular bag with a relatively wide top opening and a relatively narrow bottom opening to which is attached a transparent liquid-gage and emptying tube of approximately the same length as the bag or somewhat shorter. This tube is adapted to be bent upwards and secured parallel to the bag with its end above the expected maximum urine level, thus serving as a level gage for the contents of the bag, or to be bent downwards for emptying the bag into any suitable container.

I am aware that in the past bags for collecting the excreta of animals have been provided with bottom outlet tubes as disclosed, for example, in Norweigian Patent No. 38,083 to Fredriksen (1923). But as far as I know my device for the first time incorporates a transparent bottom tube that serves as a liquid level gage. This arrangement has extraordinary practical advantages, as described below, in collecting P.M.U. for hormone production.

My invention also comprises a rigid generally oval adapter collar conforming to the perineal region of a mare and surrounding the culva below the anus. It is provided with loops for the attachment of the straps of a retaining harness, and its rear surface is adapted to mate with the edge of the top opening of the collecting bag, which is fixedly attached to it as by cementing riveting or the like.

This adapter collar serves the purpose of keeping the top opening of the collector bag distended and in alignment with the vulva to collect urine and exclude feces, making a relatively leakproof connection with the hindquarters of the animal, and furnishing a stable base for the attachment of harness straps.

The collecting-bag-adapter unit is secured to the mare by a simple harness which may remain in place while the bag is being emptied. The harness only needs to be removed for the necessary periodic special cleaning or other servicing of the collection unit.

The following description and accompanying drawings are designed to be illustrative only of preferred embodiments of my invention and not to limit its scope which is defined in the appended claims.

Figure 1:
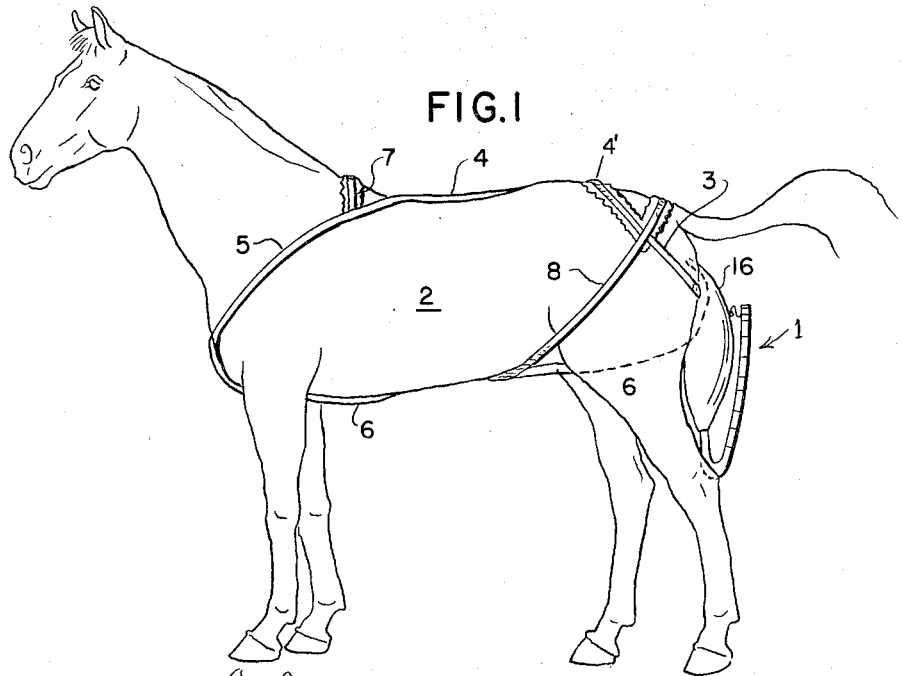
FIG. 1 represents the side view of a mare to which one of my collecting units is attached.

The collecting unit 1 is mounted on a pregnant mare 2 by means of a light harness similar in principle to that disclosed in my Canadian Patent No. 559,568, issued July 1, 1958. Since the harness per se is not considered an inventive element in the present case, it is represented in the drawing only in diagrammatic form. Two croup straps 3, each attached at one end to the collector unit, are joined at the other end to a back strap 4 at 4'. The front end of strap 4 is joined to two breast straps 5 which pass on either side of the mare's neck and are joined together in an attachment to belly strap 6. The latter passes under the mare's belly and between the hind legs, where it rear end is secured to the lower end of the adapter. A yoke strap 7, secured at each end to breast straps 5, prevents undue sideways displacement of the latter, and a diagonal yoke strap 8 passes diagonally over and on both sides of the mare's hindquarters, where it is attached to both croup straps 3, and its ends meet and are attached to the belly strap 6. Yoke strap 8 prevents sideways displacement of the hinder portion of the harness and of the collector unit.

The harness is provided with conventional adjusting means such as buckles (not shown).

Figure 2:
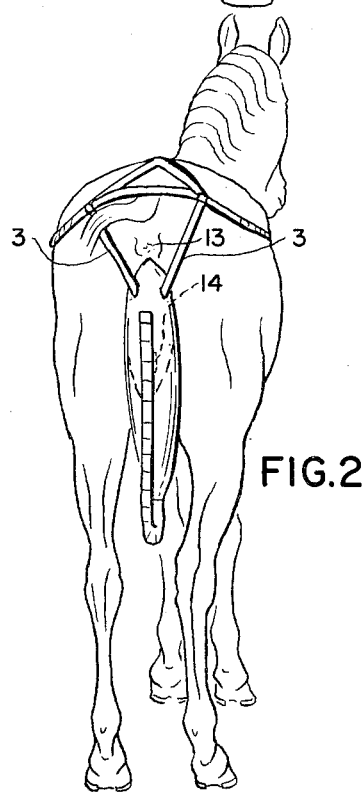
FIG. 2 is a rear view of FIG. 1.
Figure 3:
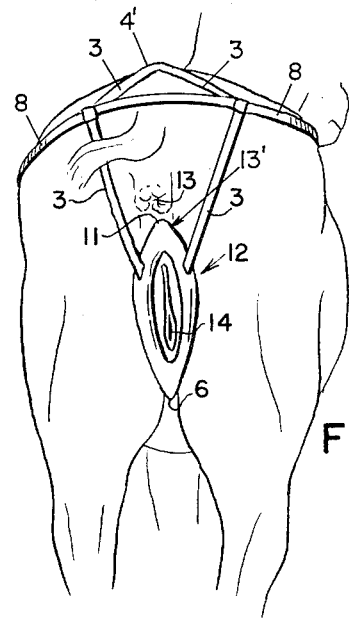
FIG. 3 is a rear view as in FIG. 2, but with the collecting bag removed, showing the position of the adapter.
Figure 4:
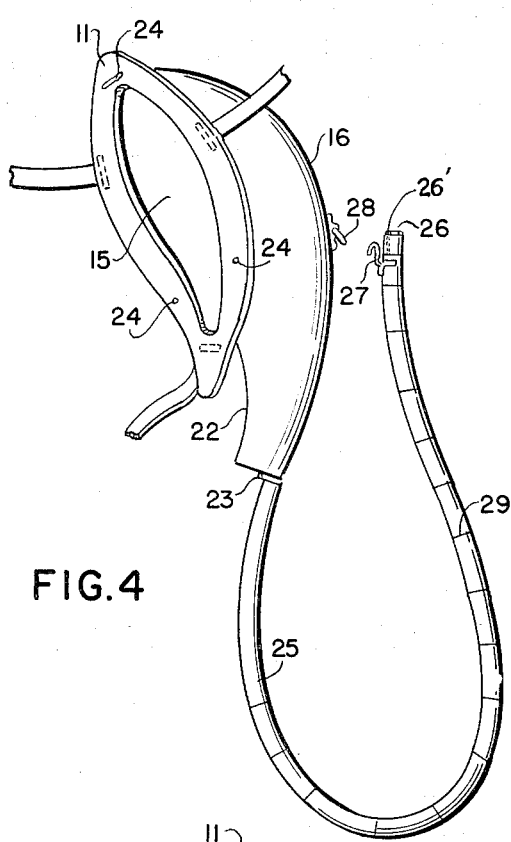
FIG. 4 is a perspective view of my collecting-bag-adapter unit assembled ready for harnessing on a mare.

It is so positioned that the upper end 11 of adapter 12 is located below the anus 13 of the mare but above the vulva 14 in the space 13' between the anus and the vulva, and the adapter collar surrounds the vulva as shown in FIGS. 2 and 3. The adapter, to which the top opening 15 of collecting bag 16 is firmly attached as shown in FIG. 4, forms a rigid entrance to the collecting bag. Because of its location on the mare and its conformity to the perineal contours of the mare, it serves to divert all feces away from and direct all urine into the collecting bag.

The weight of the collector unit 1 is thus borne primarily by croup straps 3 and transmitted to back strap 4 at 4'. The lengths of these straps are so chosen that the upper end of the adapter 11 is spaced from animal—engaging portion of straps 3 at their junction 4' with strap 4 a distance equal to that between the space 13' between anus and vulva and the normal animal-engaging portion of the harness at 4'. These distances are, of course, measured along the longitudinal center line of the animal's hindquarters and back.

Figure 5:
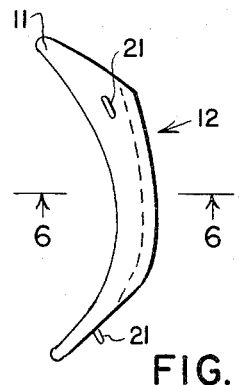
FIG. 5 is a side elevation view of my adapter.
Figure 6:
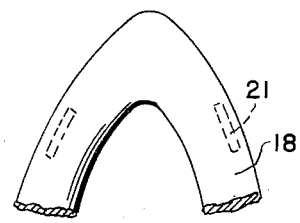
FIG. 6 is a section on line 6—6 of FIG. 5.

Adapter 12 is made in the form of a dished generally oval collar. The upper larger end is extended into a relatively wide blunt cusp 11, while the lower end is extended into a relatively slender blunt cusp 17. The sides 18 of the collar are sloped as shown in section in FIG. 6 and the adapter is curved longitudinally as shown in FIG. 5, the ends 11 and 17 being bent towards the concavity produced by the sloping of sides 18. The adapter thus has a generally dished shape, the concave side being presented to the left as shown in FIG. 5.

Figure 8:
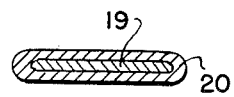
FIG. 8 is a section on an enlarged scale on the line 8—8 of FIG. 7.
Figure 7:
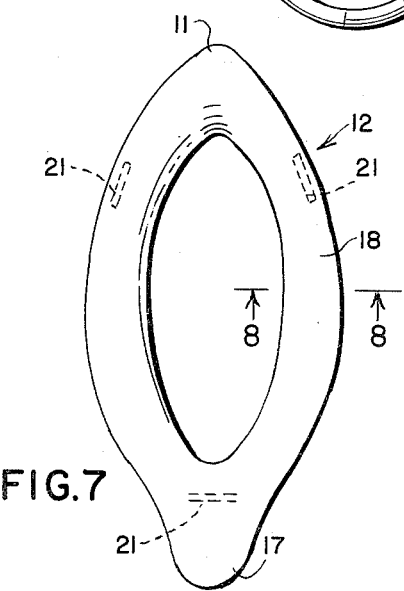
FIG. 7 is a front view of my adapter, viewing the concave side.

The adapter may be made of any inelastic sheet material which is sufficiently flexible to be formed into the desired shape but is sufficiently rigid to retain its formed shape and be self-supporting. Light-gage galvanized sheet iron 19 has been found satisfactory, and the entire adapter is preferably covered with a rubber or soft plastic or similar coating 20 to avoid irritation of the mare's hindquarters, as shown in FIG. 8.

This construction, which is adapted for use on any female quadruped, permits individual close fitting of the adapter to the contours of individual animals.

The adapter is provided with strap loops 21 for attaching the retaining harness. These may be riveted into the metal frame 19 or otherwise attached.

The collecting bag 16 may be of any suitable liquid-tight flexible material formed into an elongated receptacle with the top opening 15 of suitable size to mate with the adapter as shown in FIG. 4. I have found a section of truck tire inner tube a particularly economical and satisfactory material. Seams, where necessary, may be cemented as at 22 and 23, FIG. 4.

Bag 16 may be attached to adapter 12 by cementing edge 15 to the adapter, and the cement may be supplemented by rivets or wire ties 24.

A flexible tube 25 of transparent plastic (e.g. "Tygon") is cemented to the bottom of bag 16 and communicates with its interior at 23. The distal end of the tube is provided with a vented stopper 26 and a hook 27. The vent 26' in stopper 26 may be a notch in the side of the stopper or a small axial hole sufficient to allow the escape of air so that the tube 25 may serve as a level gage, but small enough to prevent any substantial loss of urine if the mare lies down. Alternatively, a simple float valve may be incorporated in the stopper to close the vent if tube 25 becomes filled with liquid, but ordinarily such a valve has not been found necessary in practice. Tube 25 is long enough so that it may be bent upwards as shown in FIG. 1 and secured in this position by engaging hook 27 with eye 28 fixed on the rear surface of bag 16. In this position tube 25 serves as a liquid level gage for the contents of the bag, and may advantageously be provided with calibration marks 29.

In use, the collecting unit 1 is strapped on the mare after making sure that the adapter is a good fit, the harness straps are adjusted, and tube 25 is stoppered and hooked in its upturned position to eye 28. After a suitable sample of urine has collected in bag 16 as shown by observation of the liquid level in tube 25, stopper 26 is removed, and the bag 16 is emptied into a bucket or other vessel by unhooking the tube from eye 28 and lowering it over the bucket. Tube 25 may then be re-stoppered and again hooked up, placing the unit in condition to receive a further sample of urine. This cycle may be repeated without removing the collecting unit from the mare; each emptying requires very little time of the attendant and involves a minimum of irritation and disturbance of the animal.

The volume of urine produced in a given time varies considerably with individual animals; transparent tube 25, serving as a liquid level gage, permits attendants to determine at a glance when a collecting unit requires emptying. This feature has two substantial advantages: it saves considerable time formerly required on the part of the attendants in checking yields manually (as by feeling the collecting bags), and it reduces the need for disturbing the animals.

When the collecting unit has to be removed for cleaning or other servicing, it will be noted that it can readily be flushed out and brushed out from end to end—a highly desirable feature.

While my unit has been described as applied to mares, it may also be applied to other domestic female quadrupeds such as cows, she-goats, ewes and the like by obvious modifications of contours and dimensions.

I claim:

1. A urine-collecting device for use on female quadrupeds comprising a fluid-tight bag having one end open, a vulva-encircling oval ring member attached to the periphery of the open end of said bag, and a supporting harness attached to said oval ring, said harness having an animal-engaging portion spaced from a top portion of said ring a distance equal to that between the space separating said animal's vulva and anus and that portion of the animal normally engaged by said supporting harness, said distances being measured along the longitudinal center line of the animal's hindquarters and back.

2. A urine-collecting device as defined in claim 1 adapted to collect feces-free urine from a female quadruped comprising a collector bag and a supporting harness, the collector bag being generally tubular and of a flexible liquid-tight material, the upper end being open and being provided with a fixedly attached stiffening member, the stiffening member being in the form of an oval ring the ends of which are in the form of blunt cusps, the stiffening member being of a material having sufficient flexibility to permit it to be bent to conform to the perineal region of a female quadruped but sufficient rigidity to be stable and self-supporting when so bent, and the harness being adapted to secure the unit with the stiffening member surrounding the vulva and excluding the anus of the female quadruped.

3. An adapter for use with a urine-collecting device as defined in claim 2 adapted to collect feces-free urine from a female quadruped, said adapter being in the form of a dished generally oval collar having a central opening, the sides being sloped inwards towards the central opening, the ends of the adapter being curved longitudinally towards the concavity produced by the sloping sides, the ends of the oval being extended into relatively blunt cusps, the opening in the adapter being of such size as to surround the vulva but exclude the anus of a female quadruped, the adapter being formed of an inelastic sheet material conformable on its concave side to the contours of the perineal region of a female quadruped by bending but having sufficient rigidity to be self supporting and stable in shape when so conformed.

4. A urine-collecting device as defined in claim 1 adapted to collect feces-free urine from a female quadruped comprising in combination (1) an adapter, (2) a collector bag, and (3) a supporting harness, said adapter being in the form of a dished generally oval collar having a central opening, the ends of the adapter being curved longitudinally towards the concavity produced by the sloping sides, the ends of the oval being extended into relatively blunt cusps, the opening in the adapter being of such size as to surround the vulva but exclude the anus of a female quadruped, the adapter being formed of an inelastic sheet material conformable on its concave side to the contours of the perineal region of a female quadruped by bending but having sufficient rigidity to be self supporting and stable in shape when so conformed, the upper end of the bag being secured at its edges in a liquid-tight seam to the periphery of the adapter on the convex side of the adapter.

5. A urine-collecting device as defined in claim 1, in which the lower end of the bag is provided with a transparent flexible outlet tube adapted to be bent upwards and secured parallel to the main portion of the bag, the length of said outlet tube being such that the bent-up portion is at least as long as the collecting bag.

References Cited in the file of this patent

UNITED STATES PATENTS

| | | |
|---|---|---|
| 881,753 | Whitehouse | Mar. 10, 1908 |
| 2,173,356 | Cross | Sept. 19, 1939 |
| 2,526,192 | Battles et al. | Oct. 17, 1950 |
| 2,839,061 | Inscho | June 17, 1952 |

FOREIGN PATENTS

| | | |
|---|---|---|
| 38,083 | Norway | Oct. 15, 1923 |